(12) United States Patent
Yoneda

(10) Patent No.: US 11,043,913 B2
(45) Date of Patent: Jun. 22, 2021

(54) CONTROL APPARATUS FOR ELECTRIC POWER TOOL INCLUDING BATTERY AND DC BRUSHLESS MOTOR

(71) Applicant: Panasonic Intellectual Property Management Co., Ltd., Osaka (JP)

(72) Inventor: Fumiiki Yoneda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/620,325

(22) PCT Filed: Apr. 17, 2018

(86) PCT No.: PCT/JP2018/015815
§ 371 (c)(1),
(2) Date: Dec. 6, 2019

(87) PCT Pub. No.: WO2018/230142
PCT Pub. Date: Dec. 20, 2018

(65) Prior Publication Data
US 2021/0083616 A1 Mar. 18, 2021

(30) Foreign Application Priority Data

Jun. 16, 2017 (JP) .............................. JP2017-118978

(51) Int. Cl.
*H02P 6/28* (2016.01)
*H02P 6/06* (2006.01)
*H02P 29/024* (2016.01)

(52) U.S. Cl.
CPC .............. *H02P 29/027* (2013.01); *H02P 6/06* (2013.01); *H02P 6/28* (2016.02)

(58) Field of Classification Search
CPC .. H02P 29/032; H02P 6/28; H02P 6/06; H02P 29/027; H02P 25/145
See application file for complete search history.

(56) References Cited

U.S. PATENT DOCUMENTS

| 7,817,384 B2* | 10/2010 | Woods | .................... B24B 55/00 |
| | | | 361/33 |
| 8,344,675 B2* | 1/2013 | Miwa | .................... H02P 29/032 |
| | | | 318/472 |

(Continued)

FOREIGN PATENT DOCUMENTS

| EP | 2 764 956 A1 | 8/2014 |
| JP | H04-368490 A | 12/1992 |

(Continued)

OTHER PUBLICATIONS

European Search Report for corresponding European Application 18818372.7 dated May 28, 2020.

(Continued)

*Primary Examiner* — Thai T Dinh
(74) *Attorney, Agent, or Firm* — Renner, Otto, Boisselle & Sklar, LLP

(57) ABSTRACT

A controller apparatus for an electric power tool is provided where the electric power tool includes a battery and a DC brushless motor. The controller apparatus includes a current detector that detects an instantaneous current flowing in the DC brushless motor; a current calculator that calculates one of an average value and an effective value of the instantaneous current detected by the current detector; a current controller configured to utilize a result from the current calculator as a detected value; and a speed controller configured to generate a target value of the current controller. The controller apparatus further includes a limiter that limits the target value of the current controller, where the limiter is provided at an output stage of the speed controller.

3 Claims, 1 Drawing Sheet

(56) References Cited

U.S. PATENT DOCUMENTS

| | | | |
|---|---|---|---|
| 9,553,529 B2* | 1/2017 | Omura | H02P 6/085 |
| 9,908,182 B2* | 3/2018 | Phillips | G05B 19/4083 |
| 2009/0224703 A1* | 9/2009 | Woods | H02H 7/08 |
| | | | 318/17 |
| 2012/0007748 A1 | 1/2012 | Forgues | |
| 2013/0068491 A1* | 3/2013 | Kusakawa | B25B 21/00 |
| | | | 173/176 |
| 2013/0082627 A1* | 4/2013 | Ichikawa | H02P 6/00 |
| | | | 318/139 |
| 2018/0076652 A1* | 3/2018 | Cox | H01M 10/425 |
| 2018/0115266 A1* | 4/2018 | Koniakowsky | B23B 45/02 |

FOREIGN PATENT DOCUMENTS

| | | |
|---|---|---|
| JP | 2008 196392 A | 8/2008 |
| JP | 2013-063499 A | 4/2013 |
| JP | 5814065 B2 | 11/2015 |

OTHER PUBLICATIONS

Dierk Schröder: "Elektrische Antriebe—Regelung von Antriebssystemen"; In: "Elektrische Antriebe—Regelung von Antriebssystemen"; Dec. 31, 2015 (Dec. 31, 2015); Springer-Verlag Berlin Heidelberg; pp. 120-123 (discussed in European Search Report dated May 28, 2020).

Wipasuramonton P et al: "Current-controlled PWM Technique for brushless DC motor drives with a single current sensing resistor"; INTELEC 09 : 31st International Telecommunications Energy Confernce; Incheon, Korea, Oct. 18-22, 2009; IEEE, Piscataway, NJ, USA; Oct. 18, 2009 (Oct. 18, 2009), pp. 1-5.

Notification of Transmittal of Translation of the International Preliminary Report on Patentability for corresponding Application No. PCT/JP2018/015815, dated 26 Dec. 2019.

International Search Report for corresponding Application No. PCT/JP2018/015815, dated Jul. 3, 2018.

* cited by examiner

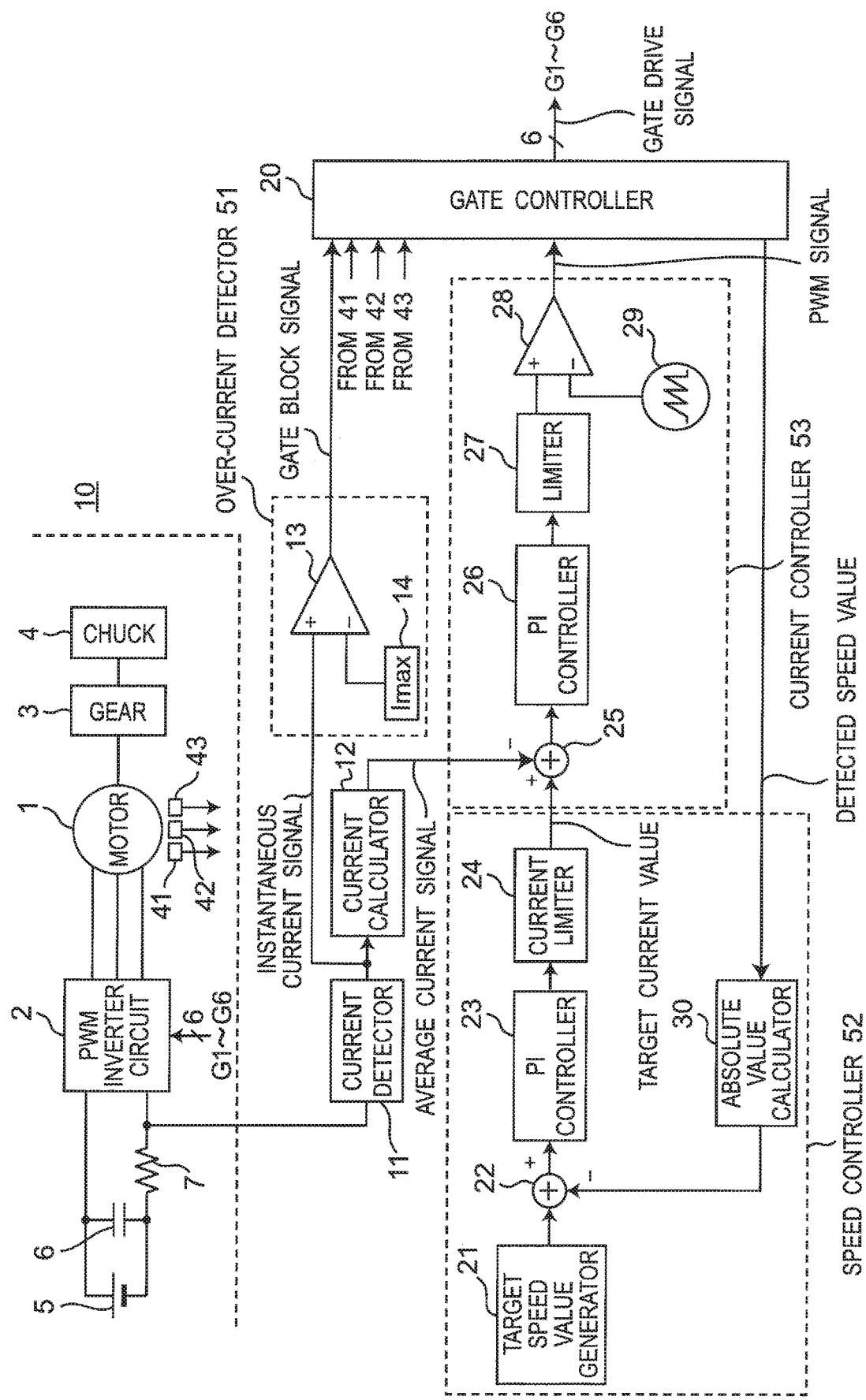

US 11,043,913 B2

CONTROL APPARATUS FOR ELECTRIC POWER TOOL INCLUDING BATTERY AND DC BRUSHLESS MOTOR

TECHNICAL FIELD

The present disclosure relates to a controller apparatus and a control method for an electric power tool including, for ex pie, a DC brushless motor, and an electric power tool.

BACKGROUND ART

In recent years, DC brushless motors are often used in electric power tools. As compared to conventional DC motors, this DC brushless motor does not require brush replacement, and has a long service life. However, the motor uses a switching device instead of a brush, and it is necessary to protect both the battery and the switching device from large current that flows when the motor is locked, upon overloaded, or the like.

As an example of a technique for solving the problem, Patent Document 1 proposes a method in which two filters having different cutoff frequencies are provided in one current detection circuit to protect both a battery (average current) and a switching device (instantaneous current).

PRIOR ART DOCUMENTS

Patent Documents

[Patent Document 1] Japanese Patent Publication No. 5814065
[Patent Document 2] Japanese Patent Laid-open Publication No. H04-368490

SUMMARY OF THE INVENTION

Problems to be Solved by the Invention

However, with the method of Patent Document 1, even if the overcurrent protection of the battery and the switching device can be performed, controllability of the electric power tool itself is not improved. In addition, from the viewpoint of continuity of use of the electric power tool, it is important to control the electric power tool not to lead to the overcurrent at the stage before detecting the overcurrent.

An object of the present disclosure is to solve the above-described problems, and to provide a controller apparatus and a control method for an electric power tool, each capable of controlling the electric power tool not to lead to any overcurrent at the stage before detecting the overcurrent, and to provide an electric power tool including the controller apparatus.

Means for Dissolving the Problems

According to the first aspect of the disclosure, there is provided a controller apparatus for an electric power tool including a battery and a DC brushless motor. The controller apparatus includes a current detector that detects an instantaneous current flowing in the DC brushless motor; a current calculator that calculates one of an average value and an effective value of the instantaneous current detected by the current detector; a current controller configured to utilize a result from the current calculator as a detected value; and a speed controller configured to generate a target value of the current controller, The controller apparatus further includes a limiter that limits the target value of the current controller, the limiter being provided at an output stage of the speed controller.

According to the second aspect of the disclosure, there is provided a control method for an electric power tool including a battery and a DC brushless motor. The control method includes: a current detection step of detecting an instantaneous current flowing in the DC brushless motor; a current calculation step of calculating one of an average value and an effective value of the instantaneous current detected in the current detection step; a current control step of utilizing a result from the current calculation step as a detected value; a speed control step of generating a target value in the current control step; and a step of limiting the target value in the current control step by a limiter provided at an output stage in the speed control step.

According to the third aspect of the disclosure, there is provided an electric power tool including a battery and a DC brushless motor. The electric power tool includes the above-mentioned controller apparatus for the electric power tool.

Effect of the Invention

According to the controller apparatus, the control method, and the like of the present disclosure, the single current detector can protect the overcurrent of the battery, the switching devices, and the circuits. Since the limiter of current control operates before the overcurrent protection is activated, the overcurrent can be prevented in advance. In addition to that, by inserting the current controller into a minor loop of the speed controller, the control performance of the entire electric power tool can be improved, and control that does not lead to any overcurrent can be done before the overcurrent is detected.

BRIEF DESCRIPTION OF THE DRAWING

FIF. 1 is a block diagram illustrating a configuration example of an electric power tool according to an embodiment of the present disclosure.

MODE FOR CARRYING OUT THE INVENTION

FIG. 1 is a block diagram illustrating a configuration example of an electric power tool according to an embodiment of the present disclosure. Referring to FIG. 1, the electric power tool according to the embodiment includes, for example, a DC brushless motor (hereinafter, referred to as a motor) 1, a PWM inverter circuit 2, a gear 3, a chuck 4, a rechargeable battery 5, a capacitor 6, a current detection resistor 7, and a motor controller apparatus 10. In this case, the motor controller apparatus 10 includes a current detector 11, a current calculator 12, an overcurrent detector 51, a speed controller 52, a current controller 53, and a gate controller 20.

The motor controller apparatus 10 according to the present embodiment protects the switching devices, the circuits, and a battery by detecting the instantaneous current and the average current of the current supplied to the PWM inverter circuit 2. At the same time, the motor controller apparatus 10 prevents the overcurrent in advance by controlling the detected average current and providing a current limiter 24 that limits a target value at an output stage of the speed controller 52 that is a current controller. In addition, the speed controller 52 is provided in front of the current controller 53, and the current control is done by a minor loop for the speed control, so that the speed sensitivity and the stability of speed control of the electric power tool are improved.

Referring to FIG. 1, a DC voltage from the rechargeable battery 5 is supplied to the PWM inverter circuit 2 via the capacitor 6 and the current detection resistor 7. The PWM inverter circuit 2 modulates the supplied DC voltage in accordance with six gate drive signals G1 to G6 from the gate controller 20, converts a modulated DC voltage to an AC voltage, and outputs AC voltage to the motor 1. In this case, the rotation of the motor 1 is transmitted to the chuck 4 of the electric power tool via the gear 3. Based on motor rotational position signals from Hall elements 41 to 43 provided in the motor 1, a PWM signal from the current controller 53, and a gate block signal from the overcurrent detector 51, then the gate controller 20 generates a speed detected value and the gate drive signals G1 to G6.

The voltage detected by the current detection resistor 7 is outputted to the current detector 11, and the current detector 11 converts the voltage into a corresponding current value, and then, outputs the current value to a non-inverting input terminal of a comparator 13 and the current calculator 12. In the current calculator 12, for example, the current value is added for a predetermined time interval using an adder, and an average value is calculated and outputted to a subtractor 25. It is noted that the current calculator 12 may calculate an effective current value or the like for a predetermined time interval, instead of the average current value for the predetermined time interval.

The overcurrent detector 51 includes the comparator 13 and a maximum current signal generator 14. The comparator 13 compares an instantaneous current signal from the current detector 11 with a maximum current signal indicating the maximum current value from the maximum current signal generator 14, generates a gate block signal from a result of the comparison, and outputs the gate block signal to the gate controller 20. When the instantaneous current exceeds the maximum current value, the gate controller 20 immediately stops drive of the PWM inverter circuit 2 and protects the switching devices.

The speed controller 52 includes an absolute value calculator 30, a target speed value generator 21, a subtractor 22, a PI controller 23 that performs proportional-integral control on motor speed, and the current limiter 24. The absolute value calculator 30 calculates an absolute value of the speed detected value from the gate controller 20, and outputs a calculated absolute value of the speed detected value to the subtractor 22. The subtractor 22 subtracts the absolute value of the speed detected value from a target speed value from the target speed value generator 21, and outputs a result of the subtraction to the PI controller 23. The PI controller 23 performs proportional-integral control on the motor speed based on the input subtraction result, and outputs a target current value for the control to the subtractor 25 via the current limiter 24. In this case, the current limiter 24 prevents the overcurrent in advance, and protects the circuits and the battery by limiting the target current value corresponding to the target speed value within a predetermined value.

The current controller 53 includes the subtractor 25, a PI controller 26, a limiter 27, a comparator 28, and a triangular wave generator 29. The subtractor 25 subtracts an average current signal from the current calculator 12 from a target current value signal indicating the target current value, so that a current control value signal indicating a result of the subtraction is outputted to the PI controller 26. The PI controller 26 performs proportional-integral control on the current control value, and outputs a control signal to a non-inverting input terminal of the comparator 28 via the limiter 27. In this case, the limiter 27 controls an de value of the PWM signal outputted from the comparator 28 within a predetermined value. The comparator 28 generates a PWM signal for driving the motor 1 by PWM modulation, and outputs the PWM signal to the gate controller 20 by comparing the control signal from the limiter 27 with a triangular wave from the triangular wave generator 29.

The gate controller 20 controls the operation of the PWM inverter circuit 2 by generating the six gate drive signals G1 to G6 based on the PWM signal and the gate block signal and outputting the gate drive signals G1 to G6 to the PWM inverter circuit 2.

In the controller apparatus 10 for the electric power tool according to the embodiment configured as described above, the single current detector 11 enables the overcurrent protection of the switching devices and the circuits in the PWM inverter circuit 2 and the battery 5. In addition, since the current limiter 24 of the current control operates before overcurrent protection can be activated, the overcurrent can be prevented in advance. In addition to that, the target current value is given from the speed controller 52 to the current controller 53 that generates the PWM signal to form the minor loop of the speed controller 52, so that there is such an effect that the control performance of the electric power tool itself can be achieved.

In the above embodiment, for example, a rotary electric power tool of a drill driver has been described. However, the present disclosure is not limited to this, and the present disclosure can be applied to an impact type electric power tool.

In the above embodiment, the rechargeable battery 5 that is a secondary battery is provided. However, the present disclosure is not limited to this, and other types of batteries such as a primary battery may be used.

In the above embodiment, the motor controller apparatus 10 may be configured mainly of hardware, or may be configured mainly of software.

The invention claimed is:

1. A controller apparatus for an electric power tool comprising a battery and a DC brushless motor, the controller apparatus comprising:

a current detector that detects an instantaneous current flowing in the DC brushless motor;

a current calculator that calculates one of an average value and an effective value of the instantaneous current detected by the current detector;

a current controller configured to utilize a result from the current calculator as a detected value; and a speed controller configured to generate a target value of the current controller, wherein the controller apparatus further comprises a first limiter that limits the target value of the current controller, the first limiter being provided at an output stage of the speed controller, wherein the current controller further comprises a subtractor, a PI controller, a second limiter and a comparator, wherein the subtractor is configured to subtract the average current signal or the effective value from a target current value signal indicating the target value, so that a current control value signal indicating a result of the subtraction is outputted to the PI controller, wherein the PI controller is configured to perform proportional-integral control on the current control value, and to output a control signal to the comparator via the second limiter, wherein the second limiter is configured to control an amplitude value of a PWM signal outputted from the comparator within a predetermined value, and wherein the comparator is configured to generate the PWM signal for driving the motor by PWM modulation, and to output the PWM signal by comparing the control signal from the second limiter with a triangular wave generated by a triangular wave generator.

2. A control method for an electric power tool comprising a battery and a DC brushless motor, the control method comprising:

a current detection step of detecting an instantaneous current flowing in the DC brushless motor;

a current calculation step of calculating one of an average value and an effective value of the instantaneous current detected in the current detection step;

a current control step of utilizing a result from the current calculation step as a detected value;

a speed control step of generating a target value in the current control step; and a step of limiting the target value in the current control step by a limiter provided at an output stage in the speed control step, wherein the control method further comprises:

a step of subtracting the average current signal or the effective value from a target current value signal indicating the target value, so that a current control value signal indicating a result of the subtraction is outputted, a step of performing proportional-integral control on the current control value, and of outputting a control signal, a step of controlling an amplitude value of a PWM signal within a predetermined value, and a step of generating the PWM signal for driving the motor by PWM modulation, and of outputting the PWM signal by comparing the control signal with a triangular wave generated by a triangular wave generator.

3. An electric power tool including a battery and a DC brushless motor, wherein the electric power tool comprises a controller apparatus for the electric power tool, wherein the controller apparatus comprises:

a current detector that detects an instantaneous current flowing in the DC brushless motor;

a current calculator that calculates one of an average value and an effective value of the instantaneous current detected by the current detector;

a current controller configured to utilize a result from the current calculator as a detected value; and a speed controller configured to generate a target value of the current controller, and wherein the controller apparatus further comprises a first limiter that limits the target value of the current controller, the first limiter being provided at an output stage of the speed controller, wherein the current controller further comprises a subtractor, a PI controller, a second limiter and a comparator, wherein the subtractor is configured to subtract the average current signal or the effective value from a target current value signal indicating the target value, so that a current control value signal indicating a result of the subtraction is outputted to the PI controller, wherein the PI controller is configured to perform proportional-integral control on the current control value, and to output a control signal to the comparator via the second limiter, wherein the second limiter is configured to control an amplitude value of a PWM signal outputted from the comparator within a predetermined value, and wherein the comparator is configured to generate the PWM signal for driving the motor by PWM modulation, and to output the PWM signal by comparing the control signal from the second limiter with a triangular wave generated by a triangular wave generator.

* * * * *